(12) United States Patent
Cao et al.

(10) Patent No.: US 9,844,106 B2
(45) Date of Patent: Dec. 12, 2017

(54) LED LINEAR CONSTANT POWER DRIVER CIRCUIT

(71) Applicant: SUZHOU INTELLI CHIPLINK ELECTRONIC POLYTRON TECHNOLOGIES INC., Suzhou (CN)

(72) Inventors: Yajun Cao, Suzhou (CN); Bin Bian, Suzhou (CN); Chang Chen, Suzhou (CN); Quan Yang, Suzhou (CN)

(73) Assignee: SUZHOU INTELLI CHIPLINK ELECTRONIC POLYTRON TECHNOLOGIES INC., Suzhou (CN)

( * ) Notice: Subject to any disclaimer, the term of this patent is extended or adjusted under 35 U.S.C. 154(b) by 0 days.

(21) Appl. No.: 15/469,075

(22) Filed: Mar. 24, 2017

(65) Prior Publication Data

US 2017/0196052 A1    Jul. 6, 2017

(30) Foreign Application Priority Data

Jan. 24, 2017   (CN) .......................... 2017 1 0062685

(51) Int. Cl.
*H05B 37/00*   (2006.01)
*H05B 33/08*   (2006.01)

(52) U.S. Cl.
CPC ..... *H05B 33/0812* (2013.01); *H05B 33/0815* (2013.01); *H05B 33/0836* (2013.01); *H05B 33/0842* (2013.01); *H05B 33/0845* (2013.01)

(58) Field of Classification Search
CPC ............ H05B 33/0812; H05B 33/0815; H05B 33/0836; H05B 33/0842; H05B 33/0845

USPC ....................... 315/185 R, 224, 307
See application file for complete search history.

(56) References Cited

U.S. PATENT DOCUMENTS

| | | | |
|---|---|---|---|
| 9,204,502 B1* | 12/2015 | Ding .................. | H05B 33/0824 |
| 2010/0045210 A1* | 2/2010 | Hariharan .......... | H05B 33/0815 315/297 |
| 2011/0037399 A1* | 2/2011 | Hung .................. | H05B 33/0815 315/219 |
| 2014/0191671 A1* | 7/2014 | Huang ............... | H05B 33/0815 315/186 |
| 2014/0312797 A1* | 10/2014 | Zanbaghi ........... | H05B 33/0815 315/224 |
| 2014/0333215 A1* | 11/2014 | Chiu .................... | H05B 33/083 315/185 R |
| 2015/0061517 A1* | 3/2015 | Fan .................... | H05B 33/0815 315/200 R |
| 2016/0143099 A1* | 5/2016 | Ding .................... | H05B 33/089 315/122 |

* cited by examiner

*Primary Examiner* — Tung X Le
(74) *Attorney, Agent, or Firm* — CBM Patent Consulting, LLC

(57) ABSTRACT

A LED linear constant power driver circuit comprises an AC power supply, a rectifier bridge, a LED light string, a master chip, a voltage adjustment resistance, a regulated capacitor, a compensation capacitor and a current adjustment resistance; an input end of the rectifier bridge is connected with the AC power supply, an output end of the rectifier bridge is connected with the LED light string and the master chip, the peripheral circuit of the master chip includes the voltage adjustment resistance, the regulated capacitor, the compensation capacitor and the current adjustment resistance that regulates the output average current of the system.

6 Claims, 5 Drawing Sheets

LED LINEAR CONSTANT POWER DRIVER CIRCUIT

This application claims priority to Chinese Patent Application Ser. No. CN201710062685.6 filed on 24 Jan. 2017.

TECHNICAL FIELD

The present invention relates to a constant output power circuit, more particularly, to a LED linear constant power driver circuit.

BACKGROUND

LED high-voltage linear constant current technology is widely used for the advantages of simple schema, low cost, no high frequency transformer and no EMC problem etc. and is increasingly applied to LED controllable silicon dimming LED linear constant current circuit currently existed in market is shown in FIG. 1, inputting alternating current voltage source is connected with the positive end of the LED light string 104 after rectification by the rectifier bridge 101, the negative end of the LED light string 104 is connected with the master chip 102, current flowing through the LED light string 104 is controlled by the master chip 102 and the current adjustment resistance 103, the output current is controlled by maintaining the current control chip and maintaining the current adjustment resistance. A problem for the existing circuit is inconstant output power that varies with the variation of busbar, when the voltage of the busbar is higher than the voltage drop of the LED light string and the initiation voltage of the chip, a constant current output can be achieved, however, when the voltage of the busbar is lower than the voltage drop of the LED light string and the initiation voltage of the chip, the light string cannot be turned on to light, by this operating way, actual average current value of the LED lamp is inconsistent so that a constant power output cannot be achieved under different output voltage and different groups of LED lamps.

SUMMARY

Purpose of the Invention

A LED linear constant power driver circuit is provided against above problems.

Technical Solution

To achieve above design purpose, the technical solution employed by the present invention is: A LED linear constant power driver circuit, comprising an AC power supply, a rectifier bridge, a LED light string, a master chip, a voltage adjustment resistance, a regulated capacitor, a compensation capacitor and a current adjustment resistance.

The input end of the rectifier bridge is connected with the AC power supply, an output end 1 of the rectifier bridge is connected with the positive end of the LED light string; the negative end of the LED light string is connected with an OUT 1 port of the master chip, the positive end of the voltage adjustment resistance; the negative end of the voltage adjustment resistance is connected with an OUT 2 port of the master chip; the positive end of the regulated capacitor is connected with the VDD port of the master chip, the negative end of the regulated capacitor is connected with an output end 2 of the rectifier bridge; the positive end of the compensation capacitor is connected with a COMP port of the master chip, the negative end of the compensation capacitor is connected with an output end 2 of the rectifier bridge; the positive end of the current adjustment resistance is connected with a CS port of the master chip, the negative end of the current adjustment resistance is connected with an output end 2 of the rectifier bridge; the GND port of the master chip is connected with the output end 2 of the rectifier bridge.

A method for regulating LED linear constant power driver circuit comprises steps as below:
(1) When the voltage of busbar is elevated to an initiating voltage of the master chip, the master chip is initiated to charge for the regulated capacitor through the VDD port;
(2) After the potential of the VDD port is established, the potential at the CS port is detected by the master chip and an average value of the samples is calculated to establish a potential at the COMP port of the compensation capacitor;
(3) The master chip detects the potential at the OUT 2 port, selecting regulation mode;
(4) The master chip detects the potential at the OUT 1 port to control the output current of the LED light string, achieving a constant output power in circles and a current detection of constant power through current adjustment resistance.

Beneficial Effects

The LED linear constant power driver circuit of the present invention may achieve a constant power input under a practical environment of fluctuating voltage; it has the advantages of high availability of light string, a high power factor, high circuit effects etc.

DETAILED DESCRIPTION

The technical solution of the invention will be further described in detail as below in combination with drawings and the embodiment.

Figure 1:
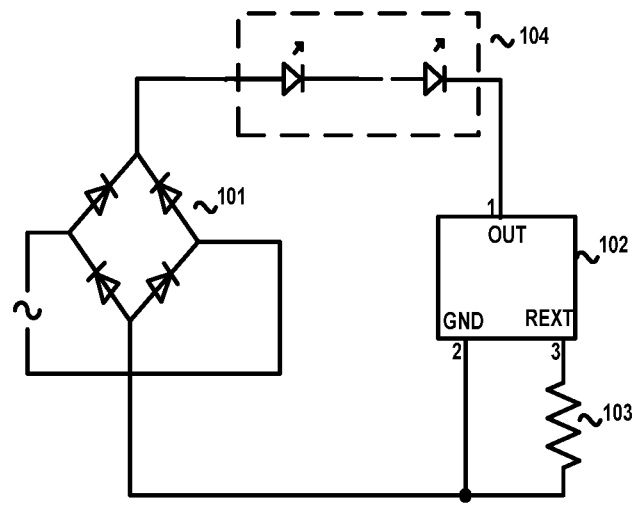
FIG. 1 illustrates an existing LED constant current circuit.
Figure 2:
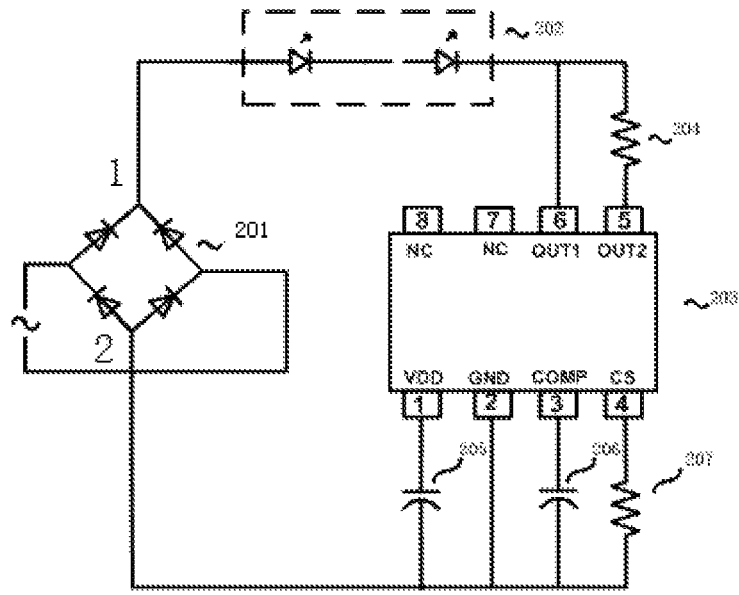
FIG. 2 illustrates the LED linear constant power driver circuit of the present invention.

As shown in FIG. 2, a LED linear constant power driver circuit comprises an AC power supply, a rectifier bridge 201, a LED light string 202, a master chip 203, a voltage adjustment resistance 204, a regulated capacitor 205, a compensation capacitor 206 and a current adjustment resistance 207. The input end of the rectifier bridge 201 is connected with the AC power supply, an output end 1 of the rectifier bridge 201 is connected with the positive end of the LED light string 202; the negative end of the LED light string 202 is connected with an OUT 1 port of the master chip 203, the positive end of the voltage adjustment resistance 204; the negative end of the voltage adjustment resistance 204 is connected with an OUT 2 port of the master chip 203; the positive end of the regulated capacitor 205 is connected with the VDD port of the master chip 203, the negative end of the regulated capacitor 205 is connected with an output end 2 of the rectifier bridge 201; the positive end of the compensation capacitor 206 is connected with a COMP port of the master chip 203, the negative end of the compensation capacitor 206 is connected with an output end 2 of the rectifier bridge 201; the positive end of the current adjustment resistance 207 is connected with a CS port of the master chip 203, the negative end of the current adjustment resistance 207 is connected with an output end 2 of the rectifier bridge 201; the GND port of the master chip 203 is connected with the output end 2 of the rectifier bridge 201. The output average current of the system is regulated by the current adjustment resistance 207.

Figure 3:
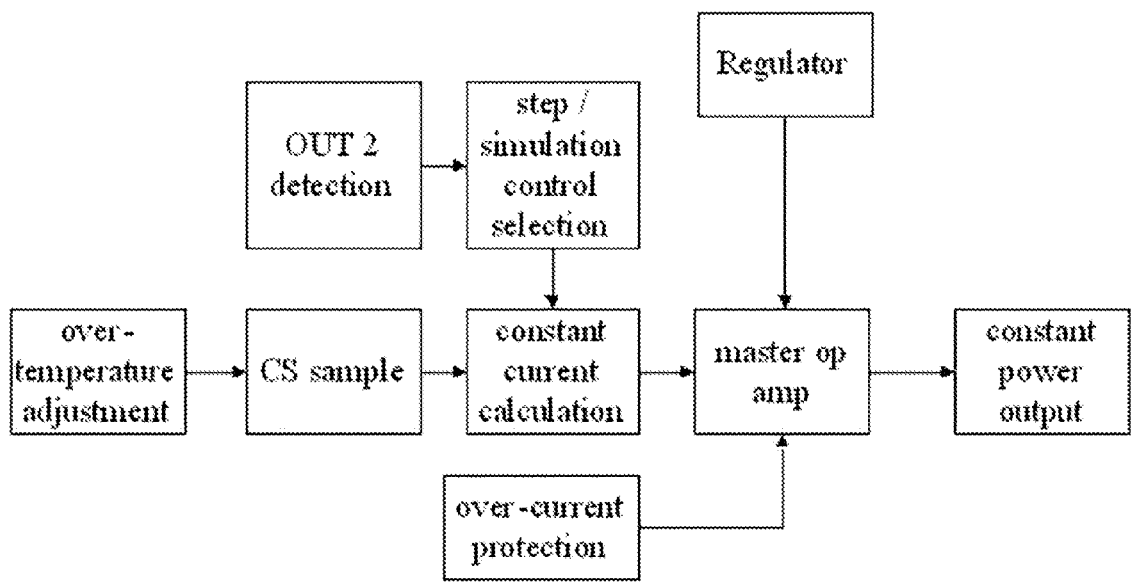
FIG. 3 illustrates an operation flow chart of the master chip.
Figure 4:
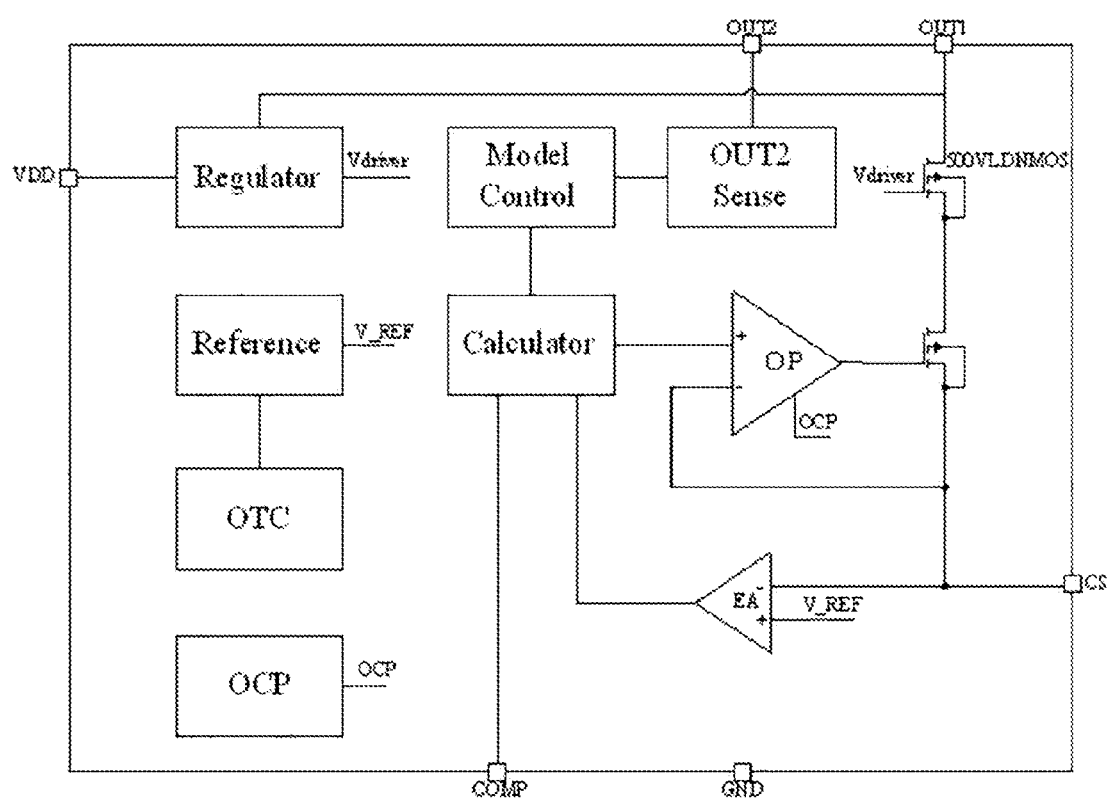
FIG. 4 is a block diagram for the inner structure of the master chip.

An operation flow chart is shown in FIG. 3, an inner structure block diagram of the master chip is shown in FIG. 4, descriptions on the operation principle of the master chip will be illustrated with the combination of FIG. 3 and FIG. 4.

As the busbar voltage rises gradually, the potential at the OUT 1 port of the master chip will rise to the initiation voltage of the chip for initiating the chip, the potential at the VDD port is established by the OUT 1 port charging for the regulated capacitor of the VDD port through REGULATOR module to generate a stabilizing inner operation voltage and a gate driving voltage of high voltage devices, the potential of the compensation capacitor at the COMP port is established by the EA module in CS Sense circuit detecting CS potential and by Calculator module calculating average of CS sense circuit samples; the potential at the OUT 2 port is detected by OUT 2 Sense module through Model Control module selecting a suitable OUT 2 potential reversing point and a comparative output current proportion of each section. Since the average of CS sense circuit samples is calculated by Calculator module, the output of the master op amp is constant over a period of time regardless of the adjustment of the OUT 2 Sense module, further a constant output power over a period of time is achieved.

When the temperature reaches a threshold of over-temperature adjustment, the system output power over a whole period of time is decreased by OTC module decreasing the reference voltage of EA; when the system current is higher than a threshold of OCP module, OCP module will be initiated to control the output voltage of master op amp for further preventing the system current from out of control.

Descriptions on the operation process for the LED linear constant power driver circuit of the present invention will be illustrated with the combination of FIG. 2, FIG. 5, FIG. 6, FIG. 7 and FIG. 8.

Figure 5:
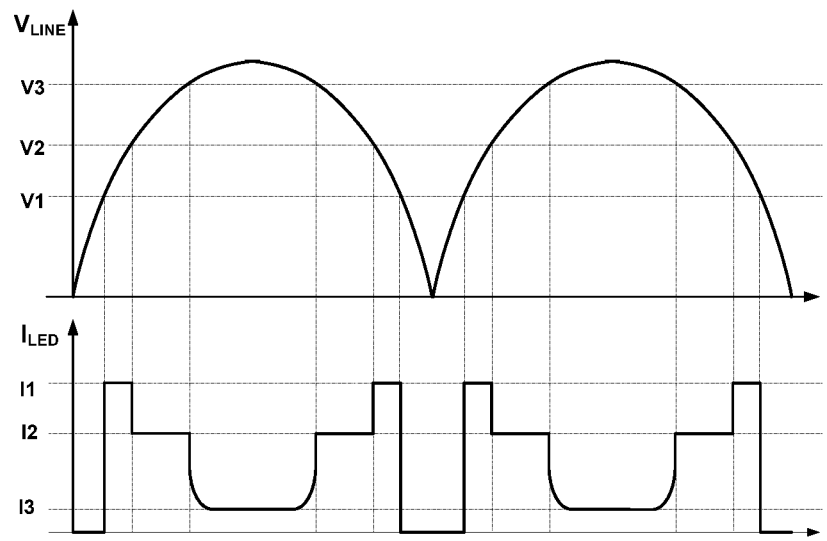
FIG. 5 is a relationship view between a hybrid control lamp string current and input voltage.

FIG. 5 is a relationship view between a hybrid control lamp string current for the LED linear constant power driver circuit of the present invention and the input voltage. With the combination of FIG. 2 and FIG. 5, when the busbar voltage $V_{LINE}$ is higher than the forward conduction voltage drop of the LED light string 202 and the initiation voltage V1 of the master chip 203, the master chip 203 begins to operate, the regulated capacitor 205 is charged by the master chip 203 through the VDD port, and current with a constant power is detected by the master chip 203 through the current adjustment resistance 207 to regulate the output current of the LED light string 202 as I1. As the busbar voltage $V_{LINE}$ rises continuously, the output current of the LED light string 202 is regulated as I2 by the master chip 203 when voltage at the OUT 1 port of the master chip 203 reaches a chip detection voltage V2. When the busbar voltage $V_{LINE}$ rises continuously, the output current of the LED light string 202 will decrease to I3 with the rise of the voltage and the output current of the LED light string 202 is maintained as I3 until the voltage at the OUT 1 port of the master chip 203 decreases to near V3 after the voltage at the OUT 1 port of the master chip 203 reaches a chip detection voltage V3. When the voltage at the OUT 1 port of the master chip 203 decreases to near V3, the output current of the LED light string 202 regulated by the master chip 203 rises slowly; after the voltage at the OUT 1 port of the master chip 203 is lower than V3, the output current of the LED light string 202 regulated by the master chip 203 is I2; after the busbar voltage $V_{LINE}$ is lower than V2, the output current of the LED light string 202 regulated by the master chip 203 is I1; after the busbar voltage is lower than V1, the output current of the LED light string 202 regulated by the master chip 203 decreases to 0 gradually. The voltage adjustment resistance 204 is used to adjust the values of V1, V2 and V3.

Figure 6:
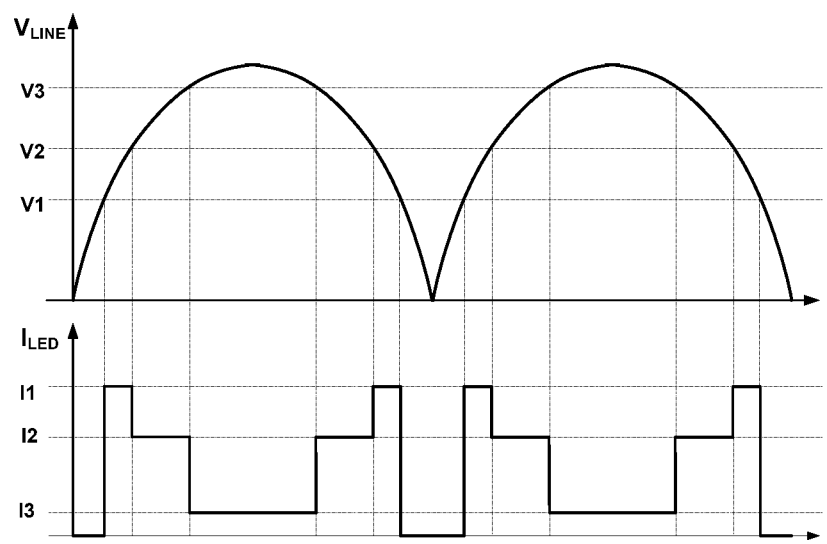
FIG. 6 is a relationship view between a three-stepped control lamp string current and input voltage.

FIG. 6 is a relationship view between a three-stepped control lamp string current for the LED linear constant power driver circuit and input voltage. With the combination of FIG. 2 and FIG. 6, when the busbar voltage $V_{LINE}$ is higher than the forward conduction voltage drop of the LED light string 202 and the initiation voltage V1 of the master chip 203, the master chip 203 begins to operate, the regulated capacitor 205 is charged by the master chip 203 through the VDD port, and current with a constant power is detected by the master chip 203 through the current adjustment resistance 207 to regulate the output current of the LED light string 202 as I1. As the busbar voltage $V_{LINE}$ rises continuously, the output current of the LED light string 202 is regulated as I2 by the master chip 203 when voltage at the OUT 1 port of the master chip 203 reaches a chip detection voltage V2. When the busbar voltage $V_{LINE}$ rises continuously, the output current of the LED light string 202 regulated by the master chip 203 is I3 and the output current of the LED light string 202 is maintained as I3 until the voltage at the OUT 1 port is lower than V3 after the voltage at the OUT 1 port reaches V3. When the voltage at the OUT 1 port is lower than V3, the output current of the LED light string 202 regulated by the master chip 203 is I2; after the busbar voltage $V_{LINE}$ is lower than V3, the output current of the LED light string 202 regulated by the master chip 203 is I1; after the busbar voltage $V_{LINE}$ is lower than V1, the output current of the LED light string 202 regulated by the master chip 203 decreases to 0 gradually. The voltage adjustment resistance 204 is used to adjust the values of V1, V2 and V3.

Figure 7:
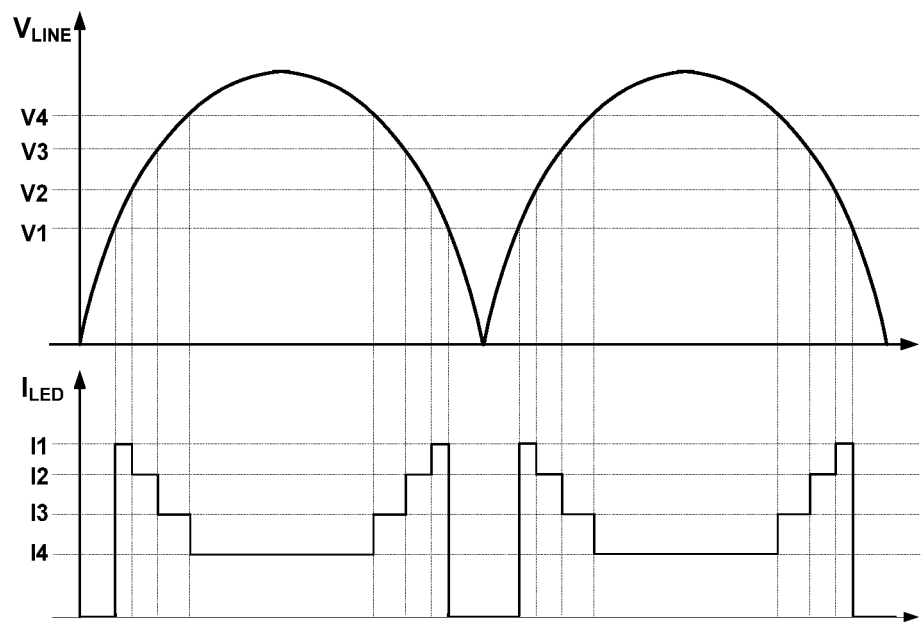
FIG. 7 is a relationship view between a four-stepped control lamp string current and input voltage.

FIG. 7 is a relationship view between a four-stepped control lamp string current for the LED linear constant power driver circuit and input voltage. With the combination of FIG. 2 and FIG. 7, when the busbar voltage $V_{LINE}$ is higher than the forward conduction voltage drop of the LED light string 202 and the initiation voltage V1 of the master chip 203, the master chip 203 begins to operate, the regulated capacitor 205 is charged by the master chip 203 through the VDD port, and current with a constant power is detected by the master chip 203 through the current adjustment resistance 207 to regulate the output current of the LED light string 202 as I1. As the busbar voltage $V_{LINE}$ rises continuously, the output current of the LED light string 202 is regulated as I2 by the master chip 203 when voltage at the OUT 1 port of the master chip 203 reaches a chip detection voltage V2. When the busbar voltage $V_{LINE}$ rises continuously, the output current of the LED light string 202 regulated by the master chip 203 is I3 after the voltage at the OUT 1 port reaches the chip detection voltage V3; as the busbar voltage $V_{LINE}$ rises continuously, the output current of the LED light string 202 regulated by the master chip 203 is I4, and the output current of the LED light string 202 is maintained as I4 until the voltage at the OUT 1 port is lower than V4 when the voltage at the OUT 1 port of the master chip 203 reaches the chip detection voltage V4. After the voltage at the OUT 1 port is lower than V4, the output current of the LED light string 202 regulated by the master chip 203 is I3; after the voltage at the OUT 1 port is lower than V3, the output current of the LED light string 202 regulated by the master chip 203 is I2; after the busbar voltage $V_{LINE}$ is lower than V2, the output current of the LED light string 202 regulated by the master chip 203 is I1; after the busbar voltage $V_{LINE}$ is lower than V1, the output current of the LED light string 202 regulated by the master chip 203 decreases to 0 gradually. The voltage adjustment resistance 204 is used to adjust the values of V1, V2, V3 and V4.

Figure 8:
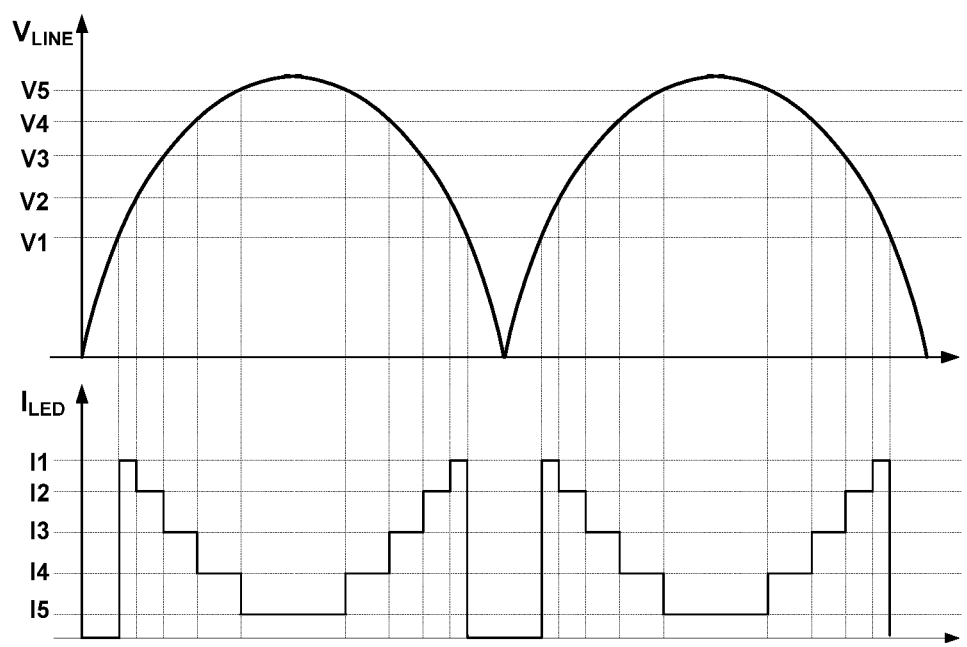
FIG. 8 is a relationship view between a five-stepped control lamp string current and input voltage.

FIG. 8 is a relationship view between a five-stepped control lamp string current for the LED linear constant power driver circuit and input voltage. With the combination of FIG. 2 and FIG. 8, when the busbar voltage $V_{LINE}$ is higher than the forward conduction voltage drop of the LED light string 202 and the initiation voltage V1 of the master chip 203, the master chip 203 begins to operate, the regulated capacitor 205 is charged by the master chip 203 through the VDD port, and current with a constant power is detected by the master chip 203 through the current adjustment resistance 207 to regulate the output current of the LED light string 202 as I1. As the busbar voltage $V_{LINE}$ rises continuously, the output current of the LED light string 202 is regulated as I2 by the master chip 203 when voltage at the OUT 1 port of the master chip 203 reaches a chip detection voltage V2. When the busbar voltage $V_{LINE}$ rises continuously, the output current of the LED light string 202 regulated by the master chip 203 is I3 after the voltage at the OUT 1 port reaches the chip detection voltage V3; when the busbar voltage $V_{LINE}$ rises continuously, the output current of the LED light string 202 regulated by the master chip 203 is I4 after the voltage at the OUT 1 port reaches the chip detection voltage V4; as the busbar voltage $V_{LINE}$ rises continuously, the output current of the LED light string 202 controlled by the master chip 203 is I5 and the output current of the LED light string 202 is maintained as I5 until the voltage at the OUT 1 port is lower than V5 when the voltage at the OUT 1 port of the master chip 203 reaches the chip detection voltage V5. After the voltage at the OUT 1 port is lower than V5, the output current of the LED light string 202 regulated by the master chip 203 is I4; after the voltage at the OUT 1 port is lower than V4, the output current of the LED light string 202 regulated by the master chip 203 is I3; after the voltage at the OUT 1 port is lower than V3, the output current of the LED light string 202 regulated by the master chip 203 is I2; after the busbar voltage $V_{LINE}$ is lower than V2, the output current of the LED light string 202 regulated by the master chip 203 is I1; after the busbar voltage $V_{LINE}$ is lower than V1, the output current of the LED light string 202 regulated by the master chip 203 decreases to 0 gradually. The voltage adjustment resistance 204 is used to adjust the values of V1, V2, V3, V4 and V5.

What is claimed is:

1. A LED linear constant power driver circuit, the driver circuit comprising an AC power supply, a rectifier bridge (201), a LED light string (202), a master chip (203), a voltage adjustment resistance (204), a regulated capacitor (205), a compensation capacitor (206) and a current adjustment resistance (207);

wherein an input end of the rectifier bridge (201) is connected with the AC power supply, an output end (1) of the rectifier bridge (201) is connected with the positive end of the LED light string (202); the negative end of the LED light string (202) is connected with an OUT1 port of the master chip (203), the positive end of the voltage adjustment resistance (204); the negative end of the voltage adjustment resistance (204) is connected with an OUT2 port of the master chip (203); the positive end of the regulated capacitor (205) is connected with a VDD port of the master chip (203), the negative end of the regulated capacitor (205) is connected with an output end (2) of the rectifier bridge (201); the positive end of the compensation capacitor (206) is connected with a COMP port of the master chip (203), the negative end of the compensation capacitor (206) is connected with the output end (2) of the rectifier bridge (201);the positive end of the current adjustment resistance (207) is connected with a CS port of the master chip (203), the negative end of the current adjustment resistance (207) is connected with the output end (2) of the rectifier bridge (201); and the GND port of the master chip (203) is connected with the output end (2) of the rectifier bridge (201).

2. The LED linear constant power driver circuit according to claim 1, wherein the rectifier bridge (201) includes four diodes.

3. The LED linear constant power driver circuit according to claim 1, wherein the LED light string (202) includes several LED lamps.

4. A method for using the LED linear constant power driver circuit of claim 1, comprising steps as following:
 (1) the master chip is initiated to charge for the regulated capacitor (205) through the VDD port when voltage of busbar is elevated to an initiating voltage of the master chip (203);
 (2) the potential at the CS port is detected by the master chip (203) and an average value of the samples is calculated to establish a potential at the COMP port of the compensation capacitor (206) after the potential of the VDD port is established;
 (3) selecting regulation mode when the master chip (203) detects the potential at the OUT2 port; and
 (4) controlling the output current of the LED light string (202) when the master chip (203) detects the potential at the OUT1 port, achieving a constant output power in circles and a current detection of constant power through current adjustment resistance (207).

5. The method according to claim 4, wherein the master chip (203) is provided with an over-temperature adjustment.

6. The method according to claim 4, wherein the master chip (203) is provided with an over-current adjustment.

* * * * *